United States Patent
Sullivan et al.

(10) Patent No.: US 7,219,731 B2
(45) Date of Patent: May 22, 2007

(54) DEGRADABLE ADDITIVE FOR VISCOELASTIC SURFACTANT BASED FLUID SYSTEMS

(75) Inventors: Philip F. Sullivan, Bellaire, TX (US); J Ernest Brown, Katy, TX (US); Jesse C. Lee, Sugar Land, TX (US); Golchehreh Salamat, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 11/159,023

(22) Filed: Jun. 22, 2005

(65) Prior Publication Data

US 2005/0252659 A1    Nov. 17, 2005

Related U.S. Application Data

(63) Continuation-in-part of application No. 10/707,022, filed on Nov. 14, 2003, now Pat. No. 7,066,260, which is a continuation-in-part of application No. 10/227,690, filed on Aug. 26, 2002, now Pat. No. 6,938,693.

(60) Provisional application No. 60/584,995, filed on Jul. 2, 2004.

(51) Int. Cl.
*E21B 43/04* (2006.01)
*E21B 43/22* (2006.01)
*E21B 43/267* (2006.01)

(52) U.S. Cl. .................. 166/278; 166/280.1; 166/283; 166/300; 166/308.2; 166/308.3; 507/260; 507/265; 507/267; 507/269; 507/902

(58) Field of Classification Search .................. None
See application file for complete search history.

(56) References Cited

U.S. PATENT DOCUMENTS 3,353,600 A    11/1967    Annis et al. .................. 166/22

(Continued)

FOREIGN PATENT DOCUMENTS

WO    03/023177    3/2003

(Continued)

OTHER PUBLICATIONS

SPE18211- *Laboratory and Field Evaluation of a Combined Fluid-Loss-Control Additive and Gel Breaker for Fracturing Fluids* By Lisa A. Cantu and Phil A. Boyd.

(Continued)

*Primary Examiner*—George Suchfield
(74) *Attorney, Agent, or Firm*—Thomas O. Mitchell; Darla Fonseca; David Cate

(57) ABSTRACT

A method is given for treating a subterranean formation penetrated by a wellbore with a viscosified fluid. The fluid contains a solid hydrolysable polyacid that upon dissolution and hydrolysis releases an acid that is a breaker for the viscosifying system. Suitable solid hydrolysable polyacids include polylactic acid and polyglycolic acid. The fluid also contains a pH control agent, present in an amount sufficient to neutralize any acid present in the solid hydrolysable polyacid before the injection and to neutralize any acid generated by the solid hydrolysable polyacid during the injection, so that the acid breaker is not available to break the fluid during the injection. In one embodiment the viscosifier is a viscoelastic surfactant fluid system and the solid hydrolysable polyacid is of a size selected to be a fluid loss additive, for example in fracturing or gravel packing. In another embodiment, the solid hydrolysable polyacid is used in particles sufficiently small that they enter the pores of the formation. In either case, the viscosifier is broken after the solid releases more acid than can be neutralized by the pH control agent.

26 Claims, 2 Drawing Sheets

U.S. PATENT DOCUMENTS

| | | | | |
|---|---|---|---|---|
| 4,715,967 | A | 12/1987 | Bellis et al. | 252/8.551 |
| 4,848,467 | A | 7/1989 | Cantu et al. | 166/281 |
| 4,957,165 | A | 9/1990 | Cantu et al. | 166/295 |
| 4,986,355 | A | 1/1991 | Casad et al. | 166/295 |
| 5,330,005 | A | 7/1994 | Card et al. | 166/280 |
| 5,439,055 | A | 8/1995 | Card et al. | 166/280 |
| 5,501,275 | A | 3/1996 | Card et al. | 166/280 |
| 5,551,516 | A | 9/1996 | Norman et al. | 166/308 |
| 5,782,300 | A | 7/1998 | James et al. | 166/278 |
| 5,939,453 | A | 8/1999 | Heller et al. | 514/452 |
| 5,964,295 | A | 10/1999 | Brown et al. | 166/308 |
| 5,979,555 | A | 11/1999 | Gadberry et al. | 166/270.1 |
| 5,979,557 | A | 11/1999 | Card et al. | 166/300 |
| 6,035,936 | A | 3/2000 | Whalen | 166/308 |
| 6,140,277 | A | 10/2000 | Tibbles et al. | 507/201 |
| 6,258,859 | B1 | 7/2001 | Dahayanake et al. | 516/77 |
| 6,509,301 | B1 | 1/2003 | Vollmer | 507/236 |
| 6,713,807 | B2 | 3/2004 | Weimer et al. | 257/306 |
| 6,828,280 | B2 | 12/2004 | England et al. | 507/202 |
| 6,837,309 | B2 | 1/2005 | Boney et al. | 166/280 |
| 6,881,709 | B2 | 4/2005 | Nelson et al. | 507/203 |
| 6,908,888 | B2 | 6/2005 | Lee et al. | 507/219 |
| 6,929,070 | B2 * | 8/2005 | Fu et al. | 166/308.2 |
| 6,938,693 | B2 | 9/2005 | Boney et al. | 166/280.1 |
| 7,008,908 | B2 * | 3/2006 | Chan et al. | 507/225 |
| 7,028,775 | B2 * | 4/2006 | Fu et al. | 166/308.2 |
| 7,066,260 | B2 * | 6/2006 | Sullivan et al. | 166/280.1 |
| 7,115,546 | B2 * | 10/2006 | Qu et al. | 507/236 |
| 7,144,844 | B2 * | 12/2006 | Qu et al. | 507/214 |
| 7,166,560 | B2 * | 1/2007 | Still et al. | 507/219 |
| 2003/0060374 | A1 | 3/2003 | Cooke, Jr. | 507/200 |
| 2003/0062160 | A1 | 4/2003 | Boney et al. | 166/278 |
| 2003/0106690 | A1 | 6/2003 | Boney et al. | 166/280 |
| 2003/0134751 | A1 | 7/2003 | Lee et al. | 507/200 |
| 2004/0094300 | A1 | 5/2004 | Sullivan et al. | 166/308.1 |
| 2004/0094301 | A1 | 5/2004 | Hughes et al. | 166/308.2 |
| 2004/0106525 | A1 | 6/2004 | Willberg et al. | 507/200 |
| 2004/0152601 | A1 | 8/2004 | Still et al. | 507/100 |
| 2004/0216876 | A1 | 11/2004 | Lee et al. | 166/280.1 |
| 2004/0221989 | A1 | 11/2004 | Zhou et al. | 166/282 |
| 2005/0034865 | A1 | 2/2005 | Todd et al. | 166/304 |
| 2005/0059558 | A1 | 3/2005 | Blauch et al. | 507/203 |
| 2005/0107265 | A1 | 5/2005 | Sullivan et al. | 507/271 |
| 2005/0161220 | A1 | 7/2005 | Todd et al. | 166/308.1 |
| 2007/0032386 | A1 * | 2/2007 | Abad et al. | 507/201 |

FOREIGN PATENT DOCUMENTS

| | | |
|---|---|---|
| WO | 2004/037946 | 5/2004 |
| WO | 2004/038176 | 5/2004 |
| WO | 2005/028587 | 3/2005 |

OTHER PUBLICATIONS

SPE68977-*Visual Observation of Produced Water Re-Injection Under Laboratory Conditions* By F.A.H. Al-Abduwani, W.M.G.T. van den Broek and P.K. Currie.

SPE24844—*Fracturing Unconsolidated Sand Formations Offshore Gulf of Mexico* By F.L. Monus, F.W. Broussard, J.A. Ayoub and W.D.Norman.

M. Economides and K. Nolte, eds., *Reservoir Stimulation*, 3rd edition, John Wiley & Sons, Ltd, New York (2000) pp. 10-21 to 10-24.

* cited by examiner

DEGRADABLE ADDITIVE FOR VISCOELASTIC SURFACTANT BASED FLUID SYSTEMS

CROSS-REFERENCE TO RELATED APPLICATION

This application claims the benefit of U.S. Provisional Patent Application Ser. No. 60/584,995, filed on Jul. 2, 2004, and is a CIP of and also claims the benefit of U.S. patent application Ser. No. 10/707,022, filed Nov. 14, 2003, now U.S. Pat. No. 7,066,260, which is a CIP of U.S. patent application Ser. No. 10/227,690 filed on Aug. 26, 2002, now U.S. Pat. No. 6,938,693.

BACKGROUND OF THE INVENTION

This invention relates to recovery of oil and gas from wells, more particularly to hydraulic fracturing and gravel packing, and most particularly to decreasing fluid loss and damage due to fluid loss additives when using viscoelastic surfactant fluid systems as carrier fluids.

There are many oilfield applications in which filter cakes are needed in the wellbore, in the near-wellbore region or in one or more strata of the formation. Such applications are those in which, without a filter cake, fluid would leak off into porous rock at an undesirable rate during a well treatment. Such treatments include drilling, drill-in, completion, stimulation (for example, hydraulic fracturing or matrix dissolution), sand control (for example gravel packing, frac-packing, and sand consolidation), diversion, scale control, water control, and others. When the filter cake is within the formation it is typically called an "internal" filter cake; otherwise it is called an "external" filter cake. Typically, after these treatments have been completed the continued presence of the filter cake is undesirable or unacceptable.

Hydraulic fracturing, gravel packing, or fracturing and gravel packing in one operation (called, for example frac and pack or frac-n-pack, or frac-pack treatments), are used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures, that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore. Gravel is also a natural or synthetic material, which may be identical to, or different from, proppant. Gravel packing is used for "sand" control. Sand is the name given to any particulate material, such as clays, from the formation that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

Solid, substantially insoluble, or sparingly or slowly soluble, materials (that may be called fluid loss additives and/or filter cake components) are typically added to the fluids used in these treatments to form the filter cakes, although sometimes soluble (or at least highly dispersed) components of the fluids (such as polymers or crosslinked polymers) may form some or all of the filter cakes. Removal of the filter cake is typically accomplished either by a mechanical means (scraping, jetting, or the like), by subsequent addition of a fluid containing an agent (such as an acid, a base, an oxidizer, or an enzyme) that dissolves at least a portion of the filter cake, or by manipulation of the physical state of the filter cake (by emulsion inversion, for example). These removal methods usually require a tool or addition of another fluid (for example to change the pH or to add a chemical). This can sometimes be accomplished in the wellbore but normally cannot be done in a proppant or gravel pack. Sometimes the operator may rely on the flow of produced fluids (which will be in the opposite direction from the flow of the fluid when the filter cake was laid down) to loosen the filter cake or to dissolve at least a part of the filter cake (for example if it is a soluble salt). However, these methods require fluid flow and often result in slow or incomplete filter cake removal. Sometimes a breaker can be incorporated in the filter cake but these must normally be delayed (for example by esterification or encapsulation) and they are often expensive and/or difficult to place and/or difficult to trigger.

In hydraulic fracturing, a first, viscous fluid called a "pad" is typically injected into the formation to initiate and propagate the fracture and often to contribute to fluid loss control. The choice of the pad fluid depends upon the nature of the subsequently injected fluid and of the formation and on the desired results and attributes of the stimulation job.

This is typically followed by a second fluid designed primarily to carry the proppant that keeps the fracture open after the pumping pressure is released. Occasionally, hydraulic fracturing is done with a second fluid that is not highly viscosified; this choice is made primarily to save chemical costs and/or as a way to reduce the deleterious effect of polymers described below. This technique, sometimes called a "water-frac" involves using extremely low polymer concentrations, so low that they cannot be effectively crosslinked, throughout the job. This alternative has a major drawback: since there is inadequate viscosity to carry much proppant, high pump rates must be used and only very small concentrations (pounds mass proppant added per gallon of fluid), called "PPA", of proppant can be used. Very little proppant will be placed in the fracture to keep it open after the pumping is stopped.

Pads and fracturing or gravel packing fluids are usually viscosified in one of three ways. If the injected fluid is an oil, it is gelled with certain additives designed for the purpose, such as certain aluminum phosphate compounds; this will not be discussed further here. If the fluid is water or brine, for hydraulic or acid fracturing, it is gelled with polymers (usually polysaccharides like guars, usually crosslinked with a boron, zirconium or titanium compound), or with viscoelastic fluid systems ("VES's") that can be formed using certain surfactants that form appropriately sized and shaped micelles. VES's are popular because they leave very clean proppant or gravel packs, but they don't form a filter cake by themselves. Polymers, especially crosslinked polymers, often tend to form a "filter cake" on the fracture face, that is they coat out on the fracture face as some fluid leaks off, provided that the rock pores are too small to permit entry of the polymer or crosslinked polymer. Some filter cake is generally desirable for fluid loss control. This process of filter cake formation is also called wallbuilding. VES fluids without fluid loss additives do not form filter cakes as a result of leak-off. VES leak-off control, in the absence of fluid loss additives, is viscosity controlled, i.e., the resistance due to the flow of the viscous VES fluid through the formation porosity limits the leak-off rate. The viscosity controlled leak-off rate can be high in certain formation permeabilities because the highly shear-thinning fluid has a low apparent viscosity in high flow velocity areas. Reducing the flow velocity (by correspondingly reducing the pressure gradient or simply as a result of the same injected volumetric flow rate leaking off into the formation through a greater surface area as the fracture grows in length and height) will allow micelle structure to reassemble and will result in regeneration of viscosity and fluid loss control. Fluid loss control may not always be optimal with VES systems, especially in higher permeability formations. On the other hand, polymers have two major deficiencies: a) the filter cake, if left in place, can impede subsequent flow of hydrocarbons into the fracture and then into the wellbore, and b) polymer or crosslinked polymer will be left in the fracture itself, impeding or cutting off flow, either by physically blocking the flow path through the proppant pack or by leaving a high viscosity fluid in the fracture. VES fluids do not form a filter cake or leave solids in the fracture. VES fluids therefore leave a cleaner, more conductive and therefore more productive fracture. They are easier to use because they require fewer components and less surface equipment, but they may be less efficient than polymers, depending upon the formation permeability and the specific VES system. It would be desirable to make the use of VES fluid systems more efficient.

Instead of conventional fluid loss additives and filter cake formation, it is known to treat a subterranean formation by pumping a colloidal suspension of small particles in a viscoelastic surfactant fluid system; see for example U.S. patent application Ser. No. 10/707,011, filed Nov. 13, 2003, and assigned to the assignee of the present application. The colloidal suspension and the viscoelastic surfactant interact to form structures that effectively bridge and block pore throats. Colloidal suspensions are typically dispersions of discrete very small particles, spherical or elongated in shape, charged so that the repulsion between similarly charged particles stabilizes the dispersion. Disturbance of the charge balance, due for instance to removing the water, changing the pH or adding salt or water-miscible organic solvent, causes the colloidal particles to aggregate, resulting in the formation of a gel. These particles are typically less than 1 micron in size, and typically in the range from about 10 to about 100 nanometers. The dispersion is prepackaged as a liquid, transparent in the case of relatively low concentrations of particles, becoming opalescent or milky at higher concentrations. In any case, the dispersion may be handled as a liquid, which greatly simplifies the dosage.

The use of a hydrolysable polyester material for use as a fluid loss additive for fluid loss control has previously been proposed for polymer-viscosified fracturing fluids. After the treatment, the fluid loss additive degrades and so contributes little damage. Further, degradation products of such materials have been shown to cause delayed breaking of polymer-viscosified fracturing fluids. U.S. Pat. No. 4,715,967 discloses the use of polyglycolic acid (PGA) as a fluid loss additive to temporarily reduce the permeability of a formation. SPE paper 18211 discloses the use of PGA as a fluid loss additive and gel breaker for crosslinked hydroxypropyl guar fluids. U.S. Pat. No. 6,509,301 describes the use of acid forming compounds such as PGA as delayed breakers of surfactant-based vesicle fluids, such as those formed from the zwitterionic material lecithin. The preferred pH of these materials is above 6.5, more preferably between 7.5 and 9.5.

Since VES fluid systems cause negligible damage, it would be desirable to use a fluid loss additive that is compatible with the VES system and also causes negligible damage. It would be desirable to use polyglycolic acid and similar materials as a fluid loss additive for VES fluid systems, but this creates a problem because these materials often contain small amounts of acid as commercially obtained and furthermore these materials typically start to hydrolyze to form acids as they are being used. The acid contained or generated by the material decreases the pH of the VES fluid system; this typically decreases the viscosity, because the viscosity of many VES fluid systems is quite pH sensitive. Therefore, simply adding the PGA or similar material to the VES fluid system would not be an acceptable solution to the problem. Inherently present monomeric acid or early dissolution of some of the PGA or similar material would deleteriously affect the viscosity of the system.

In some cases viscous fluids are used in treatments in which some or all of the fluid may be allowed to invade the formation, in which case a component is needed that is a breaker but not a fluid loss additive.

The objective of the current invention is to provide a fluid loss additive and/or breaker for VES fluid systems that retards fluid loss to the formation, does not affect the viscosity during the job, but still allows complete cleanup of the formation or the proppant or gravel pack.

SUMMARY OF THE INVENTION

One embodiment is a method of treating a subterranean formation penetrated by a wellbore that involves injecting into the formation an aqueous fluid containing water, a thickening amount of a viscoelastic surfactant system, a pH control agent, and a solid material selected from a solid that contains an acid and that hydrolyzes to release an acid, a solid that hydrolyzes to release an acid, and mixtures of such materials; the particles of the solid material form a filter cake on the face of the formation, and the pH control agent is present in an amount sufficient to neutralize any acid present in the solid material before the injection and to neutralize any acid generated by the solid material during the injection.

Optionally, the fluid is a pad fluid or a carrier fluid (containing proppant or gravel) or both. The filter cake is allowed to hydrolyze after the treatment and fluid is allowed to flow through the face of the formation. The hydrolysis releases acid after the treatment and the acid released reduces the viscosity of the viscoelastic surfactant system. Optionally, the injection is done above fracture pressure.

In another embodiment, the solid material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. A preferred example is polyglycolic acid.

In other embodiments, the solid material is in the form of fibers, beads, shavings, films, ribbons, and platelets, for example beads having an average diameter of from about 0.2 microns to about 200 microns, for example an average diameter less than about 20 microns. The concentration of the solid material is typically from about 0.6 g/L (about 5 ppt) to about 9.6 g/L (about 80 ppt). Optionally, the fluid also contains another additive that forms a part of the filter cake.

In yet other embodiments, the pH control agent is selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

A further embodiment is a method of treating a subterranean formation penetrated by a wellbore involving injecting into the formation a fluid containing a viscosifying agent, a solid material precursor of an acid breaker for the viscosifying agent selected from a solid that contains an acid and that hydrolyzes to release an acid, a solid that hydrolyzes to release an acid, and mixtures of such materials. The solid is present in particles sufficiently small that they enter pores of the formation, and the fluid also contains a pH control agent present in an amount sufficient to neutralize any acid present in the solid material before the injection and to neutralize any acid generated by the solid material during the injection, so that the acid breaker is not available to break the fluid during the injection. The injection is stopped and the solid is allowed to release acid in excess of the amount that can be neutralized by the pH control agent, thereby breaking the viscous fluid. Optionally, the viscosifying agent in this embodiment is a viscoelastic surfactant system. Optionally, the solid material is of a size that forms an internal filter cake in the pores of the formation. Optionally, the solid material is of a size that does not block the flow of fluid in the pores of the formation. The solid material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. A preferred example is polyglycolic acid. The pH control agent is selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

Yet another embodiment is a method of treating a wellbore involving injecting into the wellbore an aqueous fluid containing water, a thickening amount of a viscoelastic surfactant system, a pH control agent, and a solid material selected from a solid that contains an acid and that hydrolyzes to release an acid, a solid that hydrolyzes to release an acid, and mixtures of such materials; the pH control agent is present in an amount sufficient to neutralize any acid present in the solid material before the injection and to neutralize any acid generated by the solid material during the injection. The solid material is of a size that does not enter the pores of the formation. The solid material is selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. The pH control agent is selected from amines and alkaline earth, ammonium, and alkali metal salts of sesquicarbonates, carbonates, oxalates, hydroxides, oxides, bicarbonates, and organic carboxylates.

DETAILED DESCRIPTION OF THE INVENTION

Figure 1:
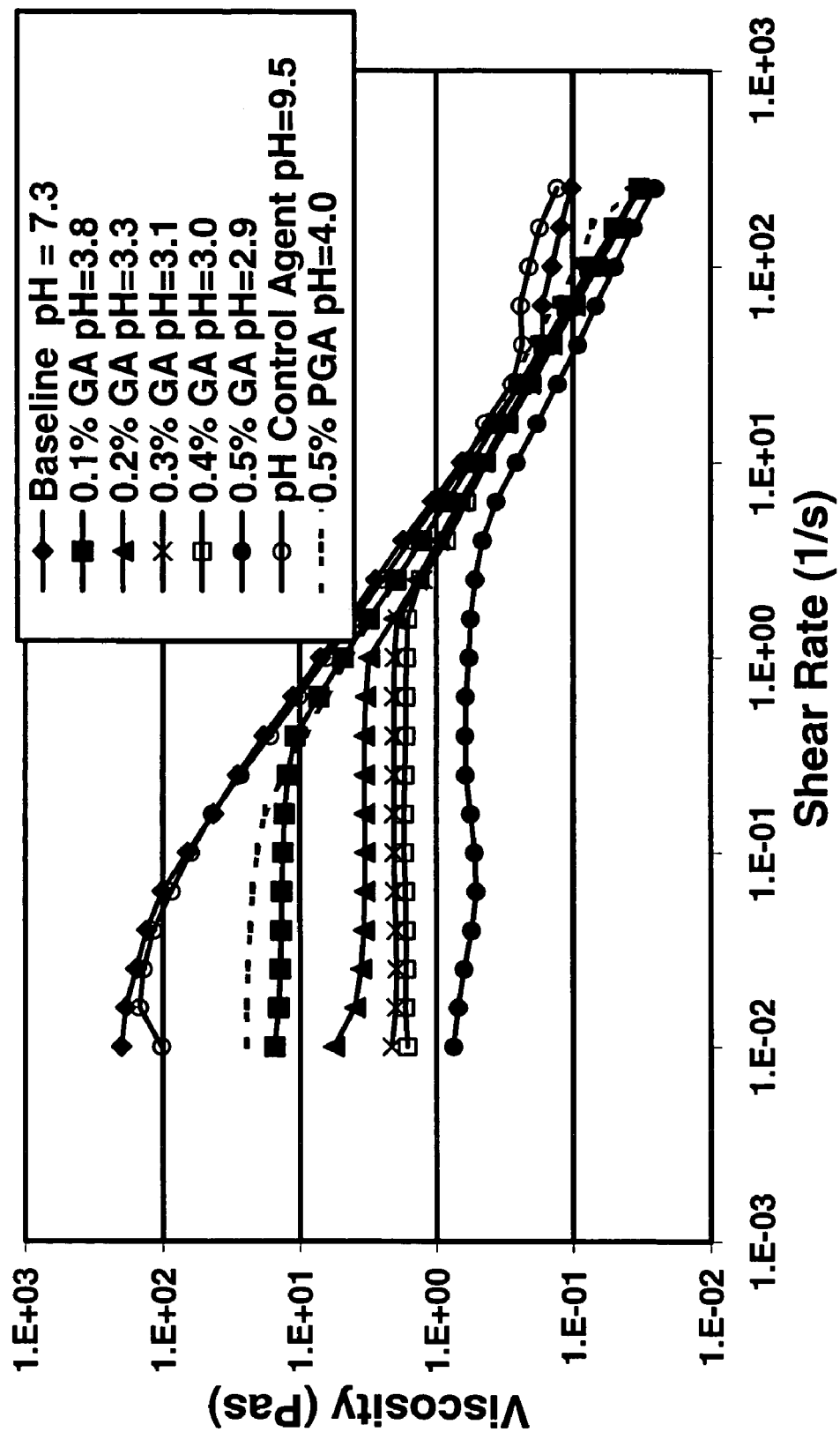
FIG. 1 shows the effect of a solid acid and its decomposition product as a function of pH on the viscosity as a function of shear rate.

In treatments of subterranean formations, in particular in hydraulic fracturing and gravel packing treatments, the total volume of fluids that needs to be pumped for completing the treatment is strongly influenced by the quantity of fluid lost to the surrounding matrix. In conventional fluids having polymers or crosslinked polymers as the viscosifying agents, during the initial phase of the treatment, the polymers or crosslinked polymers are filtered at the rock face to form a polymer filter cake that subsequently inhibits further losses. However, VES-based fluids are polymer-free—which in itself is a major advantage since polymers, remaining in the matrix (or proppant pack or gravel pack) once the treatment is over, are a main source of damage—and consequently the fluid loss process is not governed by viscosifier filter-cake formation.

To overcome the tendency of high fluid loss in polymeric and VES-based fluids (in particular in hydraulic fracturing fluids, gravel carrier fluids, and fluid loss control pills), various fluid loss control additives have been proposed. Silica, mica, and calcite, alone, in combination, or in combination with starch, are known to reduce fluid loss in polymer-based fracturing fluids, by forming a filter cake, on the formation face, which is relatively impermeable to water, as described in U.S. Pat. No. 5,948,733. Use of these fluid loss control additives alone in a VES-based fluid, however, has been observed to give only modest decreases in fluid loss, as described in U.S. Pat. No. 5,929,002. The poor performance of these conventional fluid loss additives is typically attributed to the period of high leak-off (spurt) before a filter cake is formed and to the formation of a filter cake permeable to the VES-based fluid.

We define high permeability formations here as having permeabilities of more than about 2 mD, especially more than about 10 mD, and most especially more than about 20 mD. Although there is not universal agreement on the precise relationship of particle size, pore dimension, and bridging, we will use the following guidelines here. Particles having diameters greater than about one-third (although some researchers say up to one half) of a pore throat diameter are expected to bridge at or near the formation face. Particles smaller than that but larger than about one-seventh of a pore throat diameter are expected to enter the formation and be trapped and form an internal filter cake. Particles smaller than about one-seventh of a pore throat diameter are expected to pass through the formation without substantially affecting flow. It is to be understood that there are other important factors such as distributions of particle and pore sizes, flow rate, particle concentration, and particle shape.

We have found that solid dimers, oligomers, or polymers of simple acids, or copolymers of these materials with one another, examples being PGA (polyglycolic acid) and PLA (polylactic acid), may be used, in appropriately sized particles, as a fluid loss additive that produces a breaker for a viscoelastic surfactant based fluid system, provided that it is used in combination with a suitable pH control agent that allows the VES fluid systems to maintain their viscosity if some of the solid acid hydrolyzes. A viscoelastic surfactant fluid system is a fluid viscosified with a viscoelastic surfactant and any additional materials (such as but not limited to salts, co-surfactants, rheology enhancers, stabilizers and shear recovery enhancers) that improve or modify the performance of the viscoelastic surfactant. When fluid loss control is not needed, these solids combined with pH control agents may still be used as delayed breakers, preferably in smaller particle sizes, that break the fluid wherever it is, even inside a formation matrix. These combinations of solid acid dimers, oligomers, or polymers, in combination with a pH control agent, in viscoelastic surfactant systems will be called "controlled solid acid—viscoelastic surfactant" fluid systems here, or "CSA-VES" fluid systems. The pH control agent prevents the deleterious effects of the small amount of free acid that is typically found in the as-received solid acids, and also neutralizes any acid that may be generated by hydrolysis of the solid acid during a treatment, before a break is desired. With the pH control agent present, the fluid does not become acidic enough to destroy the viscosity of the system until the pH control agent has been depleted. Then the additional acid, still forming as the solid acid continues to hydrolyze and dissolve, breaks the fluid system. On the other hand, the pH control agent usually imparts a pH to the fluid that accelerates the hydrolysis of the solid acid, which may need to be taken into account when designing a treatment if the hydrolysis rate is important.

VES fluid micelles are usually broken by the natural inflow of hydrocarbons and water or brine, but breakers such as certain salts or alcohols are sometimes also used. Acids are known to damage or destroy either the micelle/vesicle structures formed by viscoelastic surfactants or, in some cases, the surfactants themselves. Breaker aids such as activators, delay agents or stabilizers may also be used specifically in conjunction with the breakers.

Suitable solid acids for use in CSA-VES fluid systems include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Other materials suitable for use in CSA-VES fluid systems are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable solid acids are also described in U.S. Patent Application Publication Nos. 2003/002195 and 2004/0152601, both of which are hereby incorporated by reference and are assigned to the assignee of the present application.

Excellent solid acid components of CSA-VES's are solid cyclic dimers, or solid polymers, of certain organic acids, that hydrolyze under known and controllable conditions of temperature, time and pH to form organic acids. One example of a suitable solid acid is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of gylcolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. The as-received materials may contain some free acid and some solvent, typically water.

Cargill Dow, Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze; it is to be understood that the terms hydrolyze or hydrolysis, etc., are intended to include dissolution.

The solid acids may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acids by any means delays the hydrolysis. Note that coating here may refer to encapsulation or simply to changing the surface by chemical reaction or by forming or adding a thin film of another material. Another suitable method of delaying the hydrolysis of the solid acid, and the release of acid, is to suspend the solid acid, optionally with a hydrophobic coating, in an oil or in the oil phase of an emulsion. The hydrolysis and acid release do not occur until water contacts the solid acid.

The CSA-VES self-destructs in situ, that is, in the location where it is placed. That location may be part of a suspension in a treatment fluid in the wellbore, in perforations, in a gravel pack, or in a fracture; or as a component of a filter cake on the walls of a wellbore or of a fracture; or in the pores of a formation itself. The CSA-VES may be used in formations of any lithology but are used most commonly in carbonates or sandstones.

A particular advantage of these materials is that the solid acids and the generated acids are non-toxic and are biodegradable. The solid acids are often used as self-dissolving sutures.

The solid acid/pH control agent combination of this invention has been found to be particularly useful when used with several types of zwitterionic surfactants. In general, suitable zwitterionic surfactants have the formula:

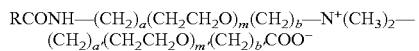

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described above; one chemical name is erucylamidopropyl betaine. BET surfactants, and others that are suitable, are described in U.S. Pat. No. 6,258,859.

Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

The combination of a pH control agent and a suitable solid acid as a method of maintaining the stability of a VES system and then breaking it may be used with any VES system that is more stable at higher pH than it is at the pH's that result from the hydrolysis of the solid acid, provided that the CSA-VES fluid system is compatible with the formation, the formation fluids, and any other fluids with which it may come in contact, for example a pad fluid, and its components and additives. These VES's include cationic, anionic, nonionic, zwitterionic and amphoteric surfactants. Examples of suitable VES systems include those described in U.S. Pat. Nos. 5,551,516; 5,964,295; 5,979,555; 5,979,557; 6,140,277; 6,258,859 and 6,509,301, all hereby incorporated by reference. Some VES systems, for example some cationic systems, are not very sensitive to pH, and some VES systems, for example some anionic systems, are typically buffered to a pH of above 12 in normal use, and the solid acid/pH control agent combination of this invention may not always be beneficial with such systems.

Although the Invention has been described throughout using the term "VES", or "viscoelastic surfactant" to describe the non-polymeric viscosified aqueous fluid in the second stage, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. Nos. 6,035,936 and 6,509,301.

Suitable pH control agents include, but are not limited to, sodium, potassium and ammonium sesquicarbonates, oxalates, carbonates, hydroxides, bicarbonates, and organic carboxylates such as acetates and polyacetates. Examples are sodium sesquicarbonate, sodium carbonate, and sodium hydroxide. Soluble oxides, including slowly soluble oxides such as MgO, may also be used. Amines and oligomeric amines, such as alkyl amines, hydroxyalkyl amines, anilines, pyridines, pyrimidines, quinolines, and pyrrolidines for example triethanolamine and tetraethylenepentamine, may also be used.

The choice of pH control agent depends in part upon the VES system used. For example, MgO generally precipitates anionic VES's but is suitable for cationic and zwitterionic VES's. Some salt-like inorganic-based pH control agents, such as carbonates, may deleteriously affect the rheology of some VES's that are sensitive to electrolyte concentration, so in those cases organic-based pH control agents such as amines would be the better choices.

The pH control agents may be added as solids or as solutions, typically concentrated for ease of transporting. The order of addition of solid acid, pH control agent, VES, and other components (such as salts) is not critical. The appropriate pH control agent concentration depends upon the solid acid concentration, the treatment temperature, and primarily upon the desired delay before the onset of the break. A factor that should be borne in mind is that excessive amounts of some pH control agents may promote solid acid hydrolysis.

CSA-VES fluid systems are used most commonly in treatments in which filter cakes are desired during the treatment but are deleterious after the treatment, especially in hydraulic fracturing and gravel packing. CSA-VES fluid systems may also be used where it is simply desirable to break viscous fluids, whether or not a filter cake is formed; in some cases the fluid may invade the formation. Such viscous fluids may be, by non-limiting example, hydraulic fracturing and gravel packing fluids in the packs or in formations, drilling fluids, wellbore cleanout fluids, fluid loss control fluids, kill fluids, spacers, flushes, pushers, and carriers for materials such as scale, paraffin, and asphaltene inhibitors.

A pad and fracturing fluid are viscosified because increased viscosity results in formation of a wider fracture, thus a larger flowpath, and a minimal viscosity is required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity aqueous fluid with good to moderate leak-off properties, and typically no proppant, into the formation. This pad is usually followed by a carrier fluid of similar viscosity carrying an initially low concentration and then a gradually increasing concentration of proppant into the extended fractures. The pad initiates and propagates the fracture but does not need to carry proppant. All the fluids tend to "leak-off" into the formation from the fracture being created. Commonly, by the end of the job the entire volume of the pad will have leaked off into the formation. This leak-off is determined and controlled by the properties of the fluid (and additives it may contain) and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the end of the fracture, stopping the lengthening of the fracture and resulting in a subsequent increase in the fracture width. On the other hand, excessive leak-off is undesirable because it may waste valuable fluid and result in reduced efficiency of the job. Proper leak-off control is therefore critical to job success.

In hydraulic fracturing, frac-packing, and gravel packing embodiments, the CSA with pH control agent may be added in the pad, throughout the treatment or to only some of the proppant or gravel stages. The solid acid may be a fiber in any of these uses and will retard flowback of proppant or gravel, and/or of fines if they are present, until the solid acid hydrolyzes and the mixture dissolves. A self-destructing fluid loss additive and filter cake is particularly useful in hydraulic fracturing, frac-packing, and gravel packing because mechanical removal methods are impossible and methods involving contacting the fluid loss additive and filter cake with an additional fluid are not practical. For example, calcite is known to be an excellent fluid loss additive, but calcite is not soluble in water, even at 150° C. Calcite has been used for years in drilling fluids to form filter cakes that are subsequently removed with acid. Furthermore, solid acids such as polyglycolic acid soften and deform at high temperatures, whereas particles of many other materials conventionally used as fluid loss additives are hard. The deformation of the solid acid makes it an even better fluid loss additive and filter cake former.

The use of CSA-VES fluid systems is particularly suitable in high permeability formations. For example, in addition to gravel packing, hydraulic fracturing followed by gravel-packing in a single operation, sometimes called a frac-pac (or frac-pack, etc.), fracpac, frac pac, frac and pac, or StimPac, sometimes with a deliberate tip screen-out to generate a short wide fracture (in which the proppant forms a bridge at the end of the fracture away from the wellbore, stopping the lengthening of the fracture and resulting in a subsequent increase in the fracture width), is usually performed in relatively high permeability formations for sand-control purposes. However, such operations are sometimes performed for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (gravel packing, fracturing followed by gravel packing, and fracturing for short wide fractures).

The rate of acid generation from a particular solid acid, having a particular chemical and physical make-up, including a coating if present, at a particular temperature and in contact with a fluid or fluids of a particular composition (for example pH and the concentration and nature of other components, especially electrolytes), is readily determined by a simple experiment: exposing the solid acid to the fluid or fluids under treatment conditions and monitoring the release of acid.

The solid acids may be manufactured and used in various solid shapes, including, but not limited to fibers, beads, films, shavings, ribbons and platelets; the most commonly used shape is beads. If the CSA is in fiber form, then most commonly, straight fibers are used; although curved, crimped, spiral-shaped and other three dimensional fiber geometries are useful. Also, the fibers may be bundled together, or hooked on one or both ends. If the CSA is used in the form of fibers, then typically the fiber length is at least about 2 millimeters, and the fiber diameter ranges from about 3 to about 200 microns. There appears to be no upper limit on the length of the fibers employed from the standpoint of utility. Handling, mixing, and pumping equipment dictate the practical upper limit for the length of fibers. If the CSA is used in the form of films, shavings, ribbons or platelets, then typically the largest dimension will be comparable to the dimensions given below for the diameters of beads. If the CSA is to be used as a fluid loss additive, the particle size of the solid acid is chosen based primarily on the desired fluid loss properties (e.g. spurt and wall building coefficient). Typical sizes for beads range from submicron, for example about 0.2 microns, to about 200 microns, for example from about 10 to about 50 microns, but the actual size depends especially upon the formation properties and on other factors known to those of ordinary skill in the art. (Submicron particles may be made, for example, by the method described in U.S. Pat. No. 6,713,807.) If the CSA is to be used as a breaker, the particles may be of a broader size range, for example from nanoparticles (for breaking a VES within a matrix) to the size of proppants for breaking carrier fluid. The choice of solid acid (and properties such as molecular weight and crystallinity) are chosen based primarily on the desired rates of hydrolysis and dissolution in the carrier fluid to be used at the temperature at which it will be used. These choices may also be influenced by the desired time before the delayed break, which could depend upon the size of the job, whether the job is hydraulic fracturing or gravel packing, and other factors known to those of ordinary skill in the art. Similarly, the concentration of the pH control agent is based upon many factors that will be clear to one of ordinary skill in the art, including the concentrations and natures of the VES, the solid acid, the pH control agent and any other additives, the temperature, and the desired time to break. The appropriate pH control agent concentration can be determined by simple laboratory experiments, for example mixing all the components, heating to the job temperature, and monitoring the viscosity. The system comprising a solid acid and a pH control agent may be used in any aqueous fluid from fresh water to heavy brines; a requirement is compatibility of the water with the VES system. The system comprising a solid acid and a pH control agent also works with VES systems that contain co-surfactants or other additives commonly included in fracturing fluids or gravel packing fluids. Again, a requirement is compatibility with the VES system. The carrier fluid (VES system plus solid acid plus pH control agent plus other additives) may be batch-mixed or mixed on-the-fly.

When one function of the CSA-VES fluid system is to control leak off, the optimal concentrations of the solid hydrolysable acid polymer in a CSA-VES fluid system can be determined by choosing the desired leak-off parameters and measuring leak-off with samples of the intended fluids and of the formation or of a rock similar to the formation. Leak-off is defined by three terms: "spurt", which is the initial rapid leak-off of fluid before a filter cake barrier is formed on the fracture face and is measured in gallons/100 square feet, and, for the subsequent leak-off that occurs even after a filter cake is formed and is governed by the viscosity and the wall-building propensity: Cw, the wall-building fluid loss coefficient, and Cv, the viscosity controlled fluid loss coefficient. Cw is not applicable where there is no wall-building material present. Cv is not applicable where there is a low, finite Cw. Cw and Cv are measured in $ft/min^{1/2}$. Preferred values of spurt, Cw and Cv respectively are 0 to about 5, about 0.001 to about 0.05, and about 0.001 to about 0.05; more preferred values are 0 to about 2, about 0.001 to about 0.008, and about 0.001 to about 0.008; most preferred values are 0 to about 1, about 0.001 to about 0.003, and about 0.001 to about 0.003. The values of these parameters (and the actual behavior they represent) can vary significantly provided that a suitable filter cake is produced in an appropriate time. A test method for determining these values is given in Navarrete, R. C., Caweizel, K. E., and Constien, V. G.: "Dynamic Fluid Loss in Hydraulic Fracturing Under Realistic Shear Conditions in High-Permeability Rocks," SPE Production and Facilities, pp 138–143 (August, 1996).

The choice of a solid acid (its chemistry), its size and shape, and its concentration, among other factors, depend upon the way it will be used, and these parameters could change during a treatment. All of these parameters may be affected by the nature of the job (for example, whether or not fluid loss control is needed), the temperature, the nature of the formation, and the time desired before a break occurs and/or the time desired by which a break has occurred. (For example, fluid loss control may not be needed when gravel packing in a low permeability formation, and the choices may be made on the basis of breaking properties.) Suitable choices may be made with the aid of simple experiments like those described above, or in the examples below, optionally with the aid of simulation software.

A typical formulation of a CSA-VES suitable for hydraulic fracturing over a broad range of temperature and formation-permeability conditions contains about 4.2 g/L (about 35 ppt) sodium sesquicarbonate, and about 4.8 g/L (about 40 ppt) polyglycolic acid (NATUREWORKS™ PGA). The PGA is typically is manufactured to have particles having about 90% smaller than 20 microns; it commonly contains up to about 5% free acid as commercially obtained. The concentration of this PGA may range from about 0.6 g/L (about 5 ppt) to about 9.6 g/L (about 80 ppt), preferably from about 2.4 g/L (about 20 ppt) to about 4.9 g/L (about 40 ppt), but if the concentration is too low for the treatment being performed, then fluid loss may be too great, and if the concentration is above about 4.8 g/L (about 40 ppt), then in most formations little or no further fluid loss is achieved. This composition has a pH of about 9.5; at lower pH's the hydrolysis rate of this PGA is lower, down to about a pH of about 5 and then faster at even lower pH's but still not as fast as at pH 9.5 even at a pH of 2. At higher pH's than 9.5, the hydrolysis is faster. At a pH of about 9.5, this PGA will hydrolyze in about 2 to 3 days at 66° C. (about 150° F.), in about 12 hours at 93° C. (about 200°in about ½ hour at 121° C. (about 250° F.). Proper balance of fluid loss control and pH control is extremely important. A preferred viscoelastic surfactant fluid system, for example for fracturing and gravel packing, contains about 1 to 10 (for example about 5 to 6) volume percent of BET-E-40 (see above) (that may contain about 1% sodium polynaphthalene sulfonate). For fluid loss control pills, the VES concentration may be much higher, for example up to 50%, to prevent wellbore fluids from invading the reservoir. However any viscoelastic surfactant system may be used that is chemically compatible with the other components of the fluid, with other fluids in which it may come in contact and with the formation, and it may be used at any concentration at which it provides suitable rheology for the intended use.

When solid acids are used in fluids in such treatments as drilling, drill-in, completion, stimulation (for example, hydraulic fracturing or matrix dissolution), sand control (for example gravel packing, frac-packing, and consolidation), diversion, and others, the solid acid is initially inert to the other components of the fluids, so the other fluids may be prepared and used in the usual way. Normally, such fluids would typically contain a fluid loss additive and filter cake former, so the solid acid replaces some or all of the fluid loss additive and filter cake former that would otherwise have been used. In many cases, if the fluid contains a component that would affect or be affected by the solid acid (such as a buffer, another acid-reactive material, or a viscosifier that forms or is incorporated in filter cakes), either the amount or nature of the solid acid or the amount or nature of the interfering or interfered-with component may be adjusted to compensate for the interaction. This may readily be determined by simple laboratory experiments.

Any additives normally used in such treatments may be included, again provided that they are compatible with the other components and the desired results of the treatment. Such additives can include, but are not limited to anti-oxidants, crosslinkers, corrosion inhibitors, delay agents, biocides, buffers, fluid loss additives, etc. The wellbores treated can be vertical, deviated or horizontal. They can be completed with casing and perforations or open hole.

In gravel packing, or combined fracturing and gravel packing, it is within the scope of the Invention to apply the fluids and methods to treatments that are done with or without a screen. Although we have described the Invention in terms of hydrocarbon production, it is within the scope of the Invention to use the fluids and methods in wells intended for the production of other fluids such as carbon dioxide, water or brine, or in injection wells. Although we have described the Invention in terms of unfoamed fluids, fluids foamed or energized (for example with nitrogen or carbon dioxide or mixtures of those gases) may be used. Adjustment of the appropriate concentrations due to any changes in the fluid properties or proppant concentration consequent to foaming would be made.

Any proppant (gravel) can be used, provided that it is compatible with the filter cake degradation agent and the bridging-promoting materials if the latter are used, the formation, the fluid, and the desired results of the treatment. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, provided that the resin and any other chemicals in the coating are compatible with the other chemicals of the Invention, particularly the components of the viscoelastic surfactant fluid micelles. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 3 kg/L, preferably about 0.12 to about 1.44 kg/L (about 1 PPA to about 25 PPA, preferably from about 1 to about 12 PPA). (PPA is "pounds proppant added" per gallon of liquid.)

Also optionally, the fracturing fluid can contain materials designed to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

EXAMPLES

Example 1

FIG. 1 shows measurements of the viscosity of one example of a VES fluid system with different amounts of glycolic acid (GA) dissolved in the fluid. Measurements were conducted at 66° C. (150° F.). The pH control agent used in the experiments shown in FIG. 1 was sodium sesquicarbonate, which was used at a concentration of 30 pounds per thousand gallons (3.6 g/L) in all experiments. The VES fluid system was made with 6% of a material called BET-E-40 obtained from Rhodia, Inc. Cranbury, N.J., U.S.A.; it contains a betaine VES surfactant having an erucic acid amide group (including a C21H41 alkene tail group) and is about 40% active ingredient, with the remainder being substantially water, sodium chloride, and isopropanol. (Before use, about 1% of DAXAD 17, a low molecular weight sodium polynaphthalene sulfonate available from Hampshire Chemical Corporation, Nashua, N.H., USA, was added to the as-received betaine surfactant BET-E-40.) This experiment showed the results that would be seen as PGA dissolves, and demonstrates the adverse effect on the fluid viscosity as the PGA hydrolyzes to form glycolic acid. In addition, the data in the figure also demonstrate that the desired viscosity can be maintained by the addition of a pH control agent to maintain the fluid pH at approximately 9.5.

It can be seen that the viscosity of the surfactant system with no pH control agent or PGA (top line, diamonds) was reduced by the addition of 0.5% PGA (42 pounds per thousand gallons, or 0.5 g/L), and the pH had already gone down to 4 when it was measured. The PGA used was DuPont TLF 6267, which may contain up to about 5% glycolic acid as received, and about 90% of which has a particle size of less than about 20 microns. This material is a crystalline PGA with a molecular weight of about 600. To simulate hydrolysis and dissolution of PGA, increasing amounts of GA were added to portions of the baseline system; this resulted in successively greater decreases in the viscosity. The viscosity of the baseline material was not affected by the addition of sodium sesquicarbonate to control the system at a pH of approximately 9.5.

Example 2

Figure 2:
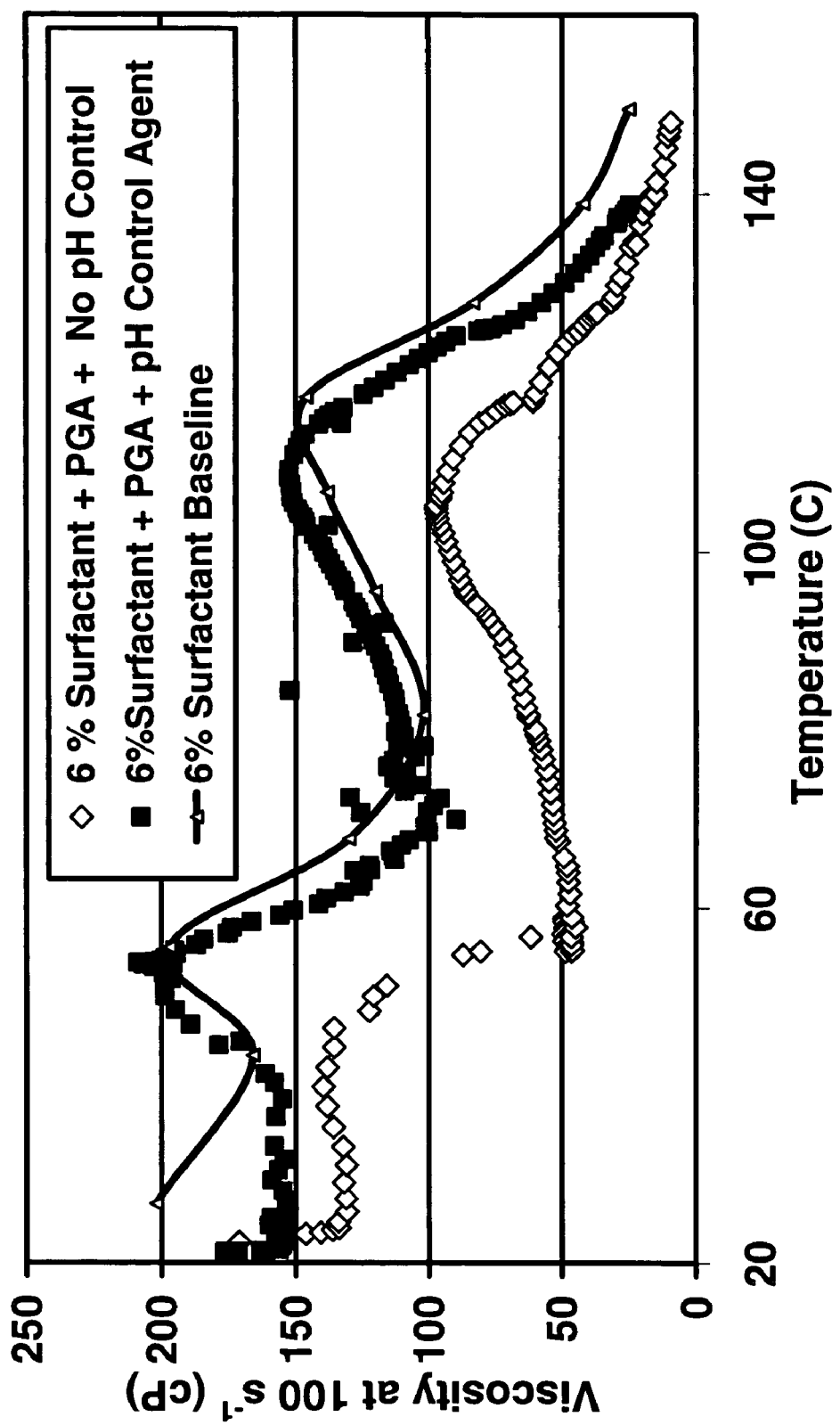
FIG. 2 shows the effect of a solid acid, with and without a pH control agent, on viscosity as a function of temperature.

FIG. 2 shows the viscosity of the same 6% surfactant fluid system as the baseline system of the experiments shown in FIG. 1, determined with a Fann 50 Viscometer over a range of temperatures, with PGA added, with and without the pH 9.5 pH control agent. Without the pH control agent in place, the viscosity of the fluid was substantially reduced; therefore this material would have been unsatisfactory as a viscous oilfield treatment fluid, for example as a fracturing or gravel packing carrier fluid. With the pH control agent present, the viscosity of the fluid system containing the PGA was essentially identical to the viscosity of the baseline system. The total duration of each of these experiments was about 3 hours. At the end of the run with the pH control agent it can be seen that the viscosity dropped below the baseline, suggesting that the hydrolysis of the PGA at the higher temperature was starting to break the fluid when the temperature was above about 121° C. (250° F.). (The pH control agent was being overwhelmed at this point.) The time that this system was at about 121° C. (250° F.) was about 160 minutes. Therefore, this fluid system, containing PGA, is suitable for use in hydraulic fracturing and gravel packing.

Field tests have shown the efficacy of CSA-VES fluid systems.

Example 3

Prior to fracturing the lower zone of a well in the Gulf of Mexico, from a mini-fall-off measurement (a simple test in which a viscous fluid is injected, a fracture is created, and the pressure fall-off is observed) it was estimated that the permeability of the sandstone zone that was 16 feet high, was 2.45 mD. The formation temperature was 195° F. (91° C.) and the volume injected was 2329 US gallons (8.82 m³). The step rate fall off measurement without a solid acid and pH control agent in a VES gave a measured fluid loss coefficient, Ct, of 0.072 ft/min$^{1/2}$. When a solid acid and pH control agent were then placed (4768 US gallons (18.05 m³) of a slurry containing 5 volume percent of BET-E-40 (containing about 1% sodium polynaphthalene sulfonate), 4.8 g/L (40 ppt) of PGA beads about 90% smaller than 20 microns, 4 weight percent KCl, and 4.2 g/L (35 ppt) sodium sesquicarbonate) and a DataFRAC was performed, the measured Ct was reduced in half to 0.035 ft/min ½. (A DataFRAC is a more involved, multiple step test in which a variety of parameters are measured and/or evaluated and includes a closure test (for closure pressure) and a calibration test (including injection, shut in, and pressure decline analysis.) The closure pressure was about 46.2 MPa (6700 psi).

Example 4

Similarly, for the upper, 20 feet high sandstone zone of the same well, the permeability was estimated at 1.5 mD from the mini-fall-off measurement and a step rate fall off test gave a measured fluid loss coefficient, Ct, of 0.047 ft/min ½. The temperature was 190° F. (88° C.) and the volume injected was 436 US gallons (1.65 m3). When a solid acid and pH control agent were then placed (8.93 m3 (2359 gallons) of the same fluid used in Example 3) and a DataFRAC was performed, the measured Ct was reduced to 0.019 ft/min ½. In each case the fluid efficiency was greatly improved.

What is claimed is:

1. A method of treating a wellbore comprising a step of injecting into the wellbore an aqueous fluid comprising water, a thickening amount of a viscoelastic surfactant system, a pH control agent, and a solid material selected from the group consisting of a solid that contains an acid and that hydrolyzes to release an acid, a solid that hydrolyzes to release an acid, and mixtures thereof, wherein the pH control agent is present in an amount sufficient to neutralize any acid present in the solid material before the injection and to neutralize any acid generated by the solid material during the injection.

2. The method of claim 1 wherein the solid material is of a size that does not enter the pores of the formation.

3. The method of claim 1 further wherein the solid material is selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

4. The method of claim 1 further wherein the pH control agent is selected from the group consisting of amines and alkaline earth, ammonium and alkali metal salts of sesquicarbonates, carbonates, oxalates, hydroxides, oxides, bicarbonates, and organic carboxylates.

5. A method of treating a subterranean formation penetrated by a wellbore comprising a step of injecting into the formation an aqueous fluid comprising water, a thickening amount of a viscoelastic surfactant system, a pH control agent, and a solid material selected from the group consisting of a solid that contains an acid and that hydrolyzes to release an acid, a solid that hydrolyzes to release an acid, and mixtures thereof, wherein the particles of the solid material form a filter cake on the face of the formation, wherein the pH control agent is present in an amount sufficient to neutralize any acid present in the solid material before the injection and to neutralize any acid generated by the solid material during the injection.

6. The method of claim 5 further wherein the fluid comprises proppant or gravel.

7. The method of claim 5 wherein the step of injecting is followed by a second step of injecting wherein the fluid in the second step of injecting comprises a proppant or gravel.

8. The method of claim 5 further wherein the filter cake is allowed to hydrolyze after the treatment and fluid is allowed to flow through the face of the formation.

9. The method of claim 5 further wherein the filter cake is allowed to hydrolyze and release acid after the treatment and acid released reduces the viscosity of the viscoelastic surfactant system.

10. The method of claim 5 further wherein the step of injecting is performed above the fracture pressure of the formation.

11. The method of claim 5 further wherein the solid material is selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

12. The method of claim 11 wherein the solid material comprises polyglycolic acid.

13. The method of claim 5 wherein the solid material is in a form selected from the group consisting of fibers, beads, shavings, films, ribbons and platelets.

14. The method of claim 13 wherein the solid material is in the form of beads having an average diameter of from about 0.2 microns to about 200 microns.

15. The method of claim 14 wherein the average diameter is less than about 20 microns.

16. The method of claim 12 wherein the concentration of the solid material is from about 0.6 g/L (about 5 ppt) to about 9.6 g/L (about 80 ppt).

17. The method of claim 5 further wherein the pH control agent is selected from the group consisting of amines and alkaline earth, ammonium and alkali metal salts of sesquicarbonates, carbonates, oxalates, hydroxides, oxides, bicarbonates, and organic carboxylates.

18. The method of claim 17 wherein the pH control agent comprises sodium sesquicarbonate.

19. The method of claim 17 wherein the amine is selected from triethanolamine and tetraethylenepentamine.

20. The method of claim 5 wherein the aqueous fluid further comprises an additive that forms a part of the filter cake.

21. A method of treating a subterranean formation penetrated by a wellbore comprising a) injecting into the formation a fluid comprising a viscosifying agent, a solid material precursor of an acid breaker for the viscosifying agent selected from the group consisting of a solid that contains an acid and that hydrolyzes to release an acid, a solid that hydrolyzes to release an acid, and mixtures thereof, said solid being present in particles sufficiently small that they enter pores of the formation, and a pH control agent, wherein the pH control agent is present in an amount sufficient to neutralize any acid present in the solid material before the injection and to neutralize any acid generated by the solid material during the injection, so that the acid breaker is not available to break the fluid during the injection, b) ceasing the injection; and c) allowing the solid to release acid in excess of the amount that can be neutralized by the pH control agent, thereby breaking the viscous fluid.

22. The method of claim 21 wherein the viscosifying agent is a viscoelastic surfactant system.

23. The method of claim 21 wherein the solid material is of a size that forms an internal filter cake in the pores of the formation.

24. The method of claim 21 wherein the solid material is of a size that does not block the flow of fluid in the pores of the formation.

25. The method of claim 21 further wherein the solid material is selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

26. The method of claim 21 further wherein the pH control agent is selected from the group consisting of amines and alkaline earth, ammonium and alkali metal salts of sesquicarbonates, carbonates, oxalates, hydroxides, oxides, bicarbonates, and organic carboxylates.

* * * * *